Nov. 13, 1934.  V. FINA  1,980,914
RELIEF BY-PASSED GATE VALVE
Filed Nov. 5, 1932

Inventor
Valentine Fina
By
Wheeler, Wheeler, and Wheeler
Attorneys

Patented Nov. 13, 1934

1,980,914

UNITED STATES PATENT OFFICE 1,980,914

RELIEF BY-PASSED GATE VALVE

Valentine Fina, Milwaukee, Wis., assignor to Milwaukee Valve Company, Milwaukee, Wis., a corporation of Wisconsin Application November 5, 1932, Serial No. 641,342

5 Claims. (Cl. 277—54)

This invention relates to improvements in relief by-passed gate valves.

It is common practice to use by-pass relief valves wherever necessary, and particularly to associate said valves with cut-off valves of various types. The present invention seeks not merely to incorporate a relief valve in a gate valve structure, but also to make the relief valve readily replaceable and to provide for the uninterrupted use of the principal valve when repairs to the relief valve are necessary.

More particularly stated, it is the object of the present invention to provide in one casing a primary valve, such as a gate valve or the like, and a by-pass controlled by a pressure operated relief valve of small dimensions, which is completely enclosed in a removable cap and readily removable as a unit, upon the removal of the cap, convenience in manipulation being one of the primary objectives.

In the drawing.

Like parts are identified by the same reference characters throughout the several views.

Figure 1:
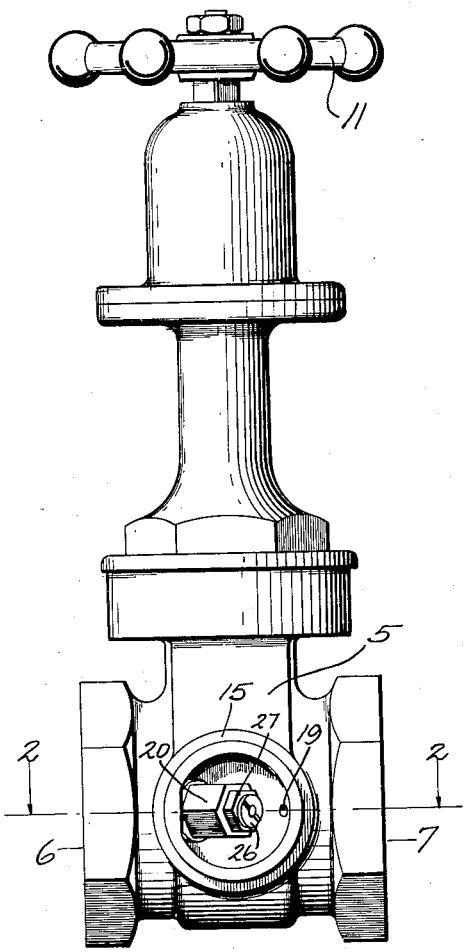
Figure 1 is a side elevation of a valve structure embodying the invention showing the relief valve as it appears upon removal of the cap which normally houses it.
Figure 2:
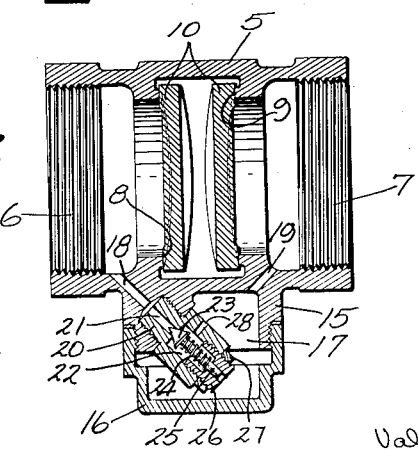
Figure 2 is a view taken in section in the plane indicated at 2—2 in Figure 1, showing the parts as they appear with the removable housing cap in place.

The main valve and its operating structure will not be described in detail in the present application, since they comprise the subject matter of a companion case and have nothing to do with the present invention. The relief valve organization herein disclosed may be applied to any type of primary valve.

The valve casing 5 has inlet and outlet ports at 6 and 7 and is equipped internally with valve seats at 8 and 9 upon which the valve gates 10 may be moved by conventional mechanism not herein disclosed when the handle 11 is manipulated.

An annular boss 15 at the side of casing 5 is threaded to receive a cap 16. The interior of the cap registers with the interior of the annular boss 15 to provide a relief valve chamber 17 which communicates through angularly inclined bores 18 and 19 with the inlet and outlet sides of the valve casing 5. In other words, bores 18 and 19 and chamber 17 constitute a by-pass around the valve gates 10.

Flow through the by-pass is wholly controlled under all normal conditions by a relief valve mechanism removably mounted in its entirety within the chamber 17. A screw plug 20 is screwed into the annular boss 15 at an angle which aligns its axis with bore 18. A hole 21 in the screw plug is aligned with bore 18 to comprise an extension thereof.

Within the counterbore 22 of the plug, a conically shaped valve 23 is movable to seat against the bottom of the counterbore and thereby to close hole 21. The usual spring 24 encircling valve stem 25 holds valve 23 to its seat. The valve stem is guided in a smaller plug 26 which closes the counterbore in plug 20 and is held by a lock nut 27. Any fluid which forces valve 23 from its seat escapes from the counterbore 22 into chamber 17 through a lateral port at 28.

It will be obvious that if the small valve becomes corroded or for any other reason becomes inoperative or starts to leak, the mere removal of the screw cap 16 will expose the entire relief valve assembly for repair, removal or replacement. If mere repair is required, it may not even be necessary to remove the screw plug 20 since the end of plug 26 will project from the valve casing to permit of the ready removal of valve 23 for examination and correction of any ordinary difficulty. If replacement is necessary, or the removal of the entire plug 20 is required, an ordinary pipe plug of like size may be substituted and cap 16 replaced to leave the valve in complete normal operating condition.

It will be noted that whether the main valve is equipped with the relief valve assembly or whether it is in temporary operation with said assembly replaced by a pipe plug, the screw cap 16 is operative under all circumstances to prevent any leakage from the system in which the valve is connected.

I claim:

1. The combination with a primary valve casing provided with a valve and valve mechanism, of a duct by-passing said valve mechanism from one side of the casing to the other and including a relief valve chamber, removable closure means connected with said casing and comprising one side of said chamber, and a relief valve organization diagonally mounted within said relief valve chamber to control flow through said duct and detachably connected with said casing for bodily removal therefrom when said closure is opened, said organization having a wrench engageable portion exposed by virtue of said diagonal mounting to manipulation by a tool applied perpendicularly to the axis of said portion.

2. A valve structure comprising the combination with a casing and inlet and outlet ports, an intervening seat and valve mechanism, of an annular boss on said casing, a closure removably applied to said boss to provide a chamber therewithin, duct means passing through said casing about the valve mechanism therein and placing said chamber in communication with said inlet and outlet portions of said casing at opposite sides of said valve mechanism, a screw plug located in said chamber and disposed to project therefrom upon removal of said closure, said plug containing duct means communicating with said first mentioned duct means, and a relief valve device operatively organized to control flow through said first mentioned duct means and said chamber, said device being bodily removable with said plug when said closure is removed to expose said chamber.

3. In a valve structure, the combination with a ported casing having a primary valve, of an annular boss on the side of the casing adjacent said valve, a screw cover for said boss, ducts leading diagonally from the interior of said boss to the casing portions at each side of said valve, a screw plug axially aligned with one of said ducts and provided with a passage communicating with said last mentioned duct, and a spring pressed relief valve wholly mounted on said screw plug and controlling flow through said passage, said plug and valve being exposed for manipulation by an ordinary wrench and unitarily removable from said boss upon removal of the cap.

4. A valve structure comprising the combination with a casing and a primary valve therein, of an annular boss on said casing adjacent the primary valve, by-pass ducts around said primary valve placing the interior of said boss in communication with casing portions at each side of the primary valve, a hollow screw cap removably secured to said boss and therewith providing a secondary valve chamber, a secondary valve mechanism detachably connected with said casing and including means for controlling the flow through one of said ducts, said mechanism being partially housed within said boss and extended so as to project into said cap and from said boss when said cap is removed whereby to be largely exposed upon the removal of said cap for manipulation by an ordinary wrench.

5. A valve structure comprising the combination with a casing and inlet and outlet ports, an intervening seat and valve mechanism, of a boss on said casing, a cap removaby applied to said boss, duct means providing a path through said cap about said valve mechanism, a screw plug located in said cap and having a wrench engaging portion projecting from said boss upon removal of said cap for actuation by a wrench applied to said portion, said plug containing duct means communicating with the first mentioned duct means, and a relief valve device operatively organized to control flow through said first mentioned duct means and said cap, said device being bodily removable with said plug when said cap is removed to expose said plug.

VALENTINE FINA.